Dec. 22, 1970  J. M. PATEL ET AL  3,549,380
UNIFORM PREWETTING OF ROAST AND GROUND COFFEE TO
IMPROVE THE EXTRACTION PROCESS
Filed Dec. 31, 1968
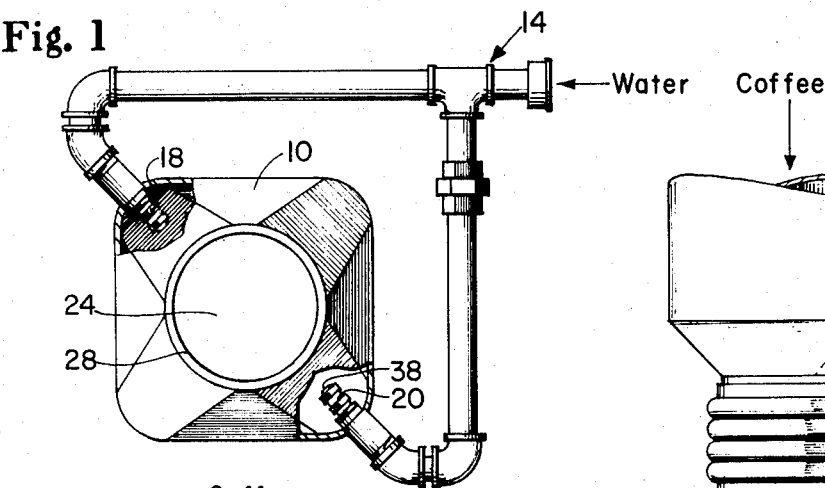
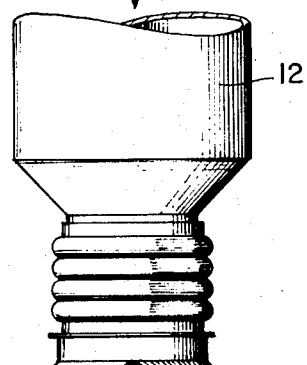
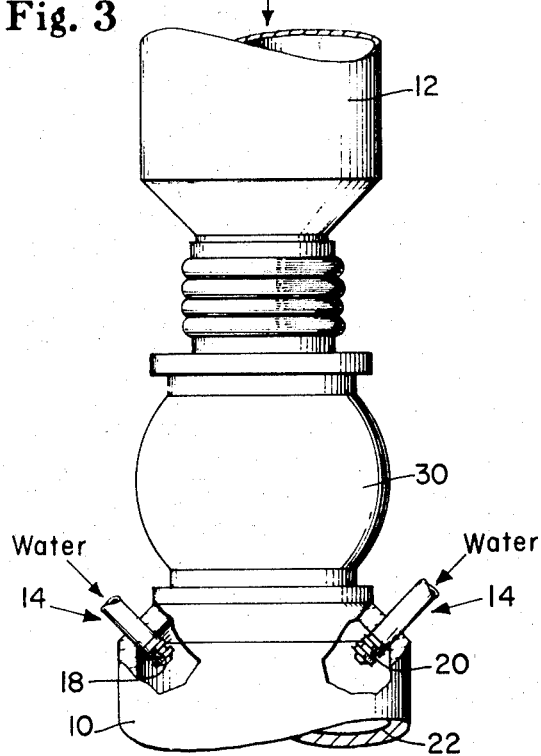
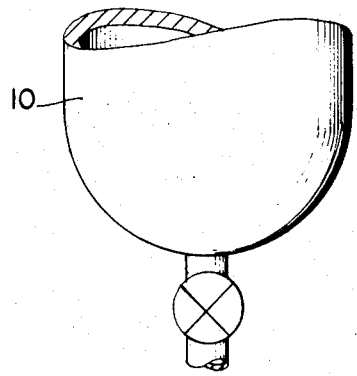
INVENTORS
Jayantilal M. Patel
David A. Strang
BY *Edmund J. Sease*
ATTORNEY

United States Patent Office 3,549,380
Patented Dec. 22, 1970

3,549,380
UNIFORM PREWETTING OF ROAST AND
GROUND COFFEE TO IMPROVE THE
EXTRACTION PROCESS
Jayantilal M. Patel, Reading, David A. Strang, Springfield Township, Hamilton County, Ohio, assignors to The Procter & Gamble Company, Cincinnati, Ohio, a corporation of Ohio
Filed Dec. 31, 1968, Ser. No. 789,042
Int. Cl. A23f 1/08
U.S. Cl. 99—71                                7 Claims

ABSTRACT OF THE DISCLOSURE

Disclosed is a process of uniformly prewetting roast and ground coffee during the loading of said coffee into an extraction column.

BACKGROUND OF THE INVENTION

Prewetting of roast and ground coffee in the extraction process is known in the art. For example see Sivetz and Foote, Coffee Processing Technology, Avi Publishing Company, 1963, vol. 1, page 338 which is incorporated herein by reference. The Sivetz reference teaches that prewetting has the advantages of improving cup flavor, assisting in gas liberation from the disrupted cells of the roast and ground coffee, reducing the channeling of fines during the extraction process, and contributing to lower frequencies of excessive pressure drops. Additionally, the Sivetz reference says that prewetting can be done outside of the extraction column but further notes that this practice is bad "because it causes staling of ground coffee in less than an hour, accompanied by a heavy undesirable flavor and a loss in natural coffee volatiles." Sivetz teaches that prewetting of roast and ground coffee within the extraction columns subsequent to loading allows more fresh coffee solubles to be released before hydrolysis products and tars are pushed through the system.

Kappenberg et al. in U.S. Pat. 2,340,758 discloses prewetting by uniformly distributing prewetting liquid through the coffee mass "as by spraying it with agitation." The Kappenberg et al. reference teaches prewetting outside of the extraction column previous to loading and thereafter the wetted coffee after swelling is transmitted to the extraction chamber where it is packed either by hand or mechanically. This process, according to Kappenberg et al., is described to have the advantage of continuous operation without channeling, clogging, buildup of high back pressures and the like, and also the attendant advantage of high throughput. The patent notes that as a result of the prewetting more finely ground coffee can be used. The patent further notes that it is not feasible to prewet the fresh roast and ground coffee in the extraction chamber because it cannot be evenly wetted and, more seriously, it expands when wetted within the restricted space causing the formation of dense masses and consequent jamming of the columns.

As shown by these two prior art references there are certain advantages in prewetting after entry into the extraction column and certain advantages in prewetting before entry into the extraction column. However, as shown by the teachings of these references both prewetting prior to placement in the column and prewetting after placement in the column also have accompanying disadvantages. If the prewetting is done prior to placement of the roast and ground coffee in the extraction column, the grind size of the roast and ground coffee must be smaller to compensate for the swelling of the coffee particles which naturally occurs upon wetting. The swelling of the coffee particles, as one would expect, increase their volume and thereby decreases the load capacity of the extraction column. Decreasing the load capacity of the extraction column decreases the throughput of the column and thereby lessens extraction efficiency.

Prewetting inside of the extraction columns, as shown in the Sivetz reference, has several disadvantages. For example, once the roast and ground coffee is packed inside of the extraction column, prewetting of said coffee in a uniform manner is a practical impossibility. As a result, some of the coffee particles are prewetted and swell and others are not contacted with the prewetting liquid and, therefore, do not swell. This non-uniform prewetting causes large pressure drops across the extraction columns which often results in clogging of the extraction columns and necessitates a complete shutdown followed by a time consuming cleaning process. Additionally, prewetting inside of the column necessitates the use of lower levels of coffee fines which, in turn, decreases product yield. Coffee fines, as the term is used herein, is defined as roast and ground coffee capable of passing through a 20 mesh U.S. Standard Screen. The reason that less coffee fines can be used if prewetting inside of the extraction column is practiced is because prewetting inside the columns is not uniform and oftentimes the fines are not contacted with the prewetting liquid. Because the fiines are not contacted with the prewetting liquid, they do not exhibit the usual swelling phenomena associated with prewetting. Thus the un-wetted fines tend to remain at their non-prewet original sizes and as they agglomerate during extraction they tend to clog the extraction columns, causing a buildup of back pressure which, in turn, necessitates a shutdown and cleaning process.

Practicing the process of this invention combines the advantages of prewetting outside of the extraction column and prewetting inside of the extraction column without the attendant disadvantages of either process. Pressure drops and backup pressure are no longer a problem, the packing capacity of the extraction columns can be increased, the percentages of fines employed can be higher, the extraction cycle time can be reduced, and the yield can be increased. Additionally, less handling of the coffee occurs which increases overall process efficiency.

Accordingly, it is an object of this invention to provide a novel method of prewetting roast and ground coffee which combines the advantages of prewetting outside of the extraction columns and prewetting inside of the extraction columns without the attendant disadvantages of either process.

Another object of this invention is to provide a method of prewetting roast and ground coffee which eliminates the problem of excessive pressure drops within the extraction columns.

Still another object of this invention is to provide a method of prewetting roast and ground coffee which allows a higher percentage of fines to be used in the extraction process.

Another object of this invention is to provide a method of prewetting roast and ground coffee which prevents the staling of the roast and ground coffee prior to its entry into the extraction columns.

Another object of this invention is to provide a method of prewetting roast and ground coffee which increases the extraction capacity.

Other objects and advantages will become apparent from the following description.

SUMMARY OF THE INVENTION

The method of this invention involves uniformly prewetting roast and ground coffee during the loading of said coffee into an extraction column. The prewetting is preferably accomplished by spraying. The moisture content of the roast and ground coffee is increased from an initial naturally occurring level of about 3 to about 6 weight percent to a final level of from about 10 to about 30 weight percent. The prewetting liquid employed can be water or coffee extract.

More specifically, the method of prewetting of this invention comprises prewetting roasted and ground coffee by uniformly dispersing aqueous liquid on said coffee as it is being loaded into an extraction column to provide uniformly prewet loaded coffee.

BRIEF DESCRIPTION OF THE DRAWING

In order to illustrate the process of this invention, a preferred method of operation will be described in connection with the drawing which illustrates schematically two apparatus embodiments according to which the process can be conducted.

FIG. 1 is a plan view of an extraction column 10, with the loading hopper 12 (depicted in FIG. 2 described below) removed, which shows how a spraying apparatus 14 can be employed to accomplish the prewetting during loading, as described in this invention.

FIG. 2 is a side view of a portion of an extraction column 10 with the loading hopper 12 and the spraying apparatus 14 shown in FIG. 1, mounted on the extraction column. The spraying apparatus 14 is enclosed by outer covering 16.

FIG. 3 shows a side view of a second apparatus embodiment with parts broken away to show the spraying apparatus 14 position. The spraying nozzles 18 and 20 rather than being mounted above the extraction column 10 as in FIG. 1 are mounted on the inside wall 22 of the extraction column 10 near the top opening 24 of said column 10.

DETAILED DESCRIPTION

Coffee extraction is an important part of instant coffee processing. Problems encountered in the coffee extraction process affect the capacity and the economics of a manufacturing plant. Thus, careful control of the coffee extraction process can have significant effects upon the cost of producing an instant coffee product. Instant coffee preparation by coffee extraction is usually done by the countercurrent method. Counter-current extractiton is a term used in the instant coffee art to describe a process of extraction wherein fresh water is entered into one end of a plurality of extraction columns and wherein the water passes through one column to another and is successively contacted by progressively fresher coffee grounds. The last column contains the freshest coffee grounds. For a detailed description of counter-current extraction see Sivetz, Coffee Processing Technology, 1963 edition, vol. 1, pages 262–280 which is incorporated herein by reference. Counter-current extraction is usually conducted semi-continuously in a counter-current manner so that the fresh liquor (water) entering the system at one end becomes continually more concentrated with dissolved coffee solids as it contacts progressively fresher coffee grounds in successive columns. Each extraction column is initially filled with a bed of fresh roast and ground coffee from a coffee containing vessel such as a loading hopper 12 shown in FIGS. 2 and 3. After the content of solubles in the bed of a column has been fully hydrolyzed and extracted, that column is disconnected from the system and the spent or exhausted coffee grounds are withdrawn and discarded. Simultaneously, or more commonly, just before the spent grounds are withdrawn a fresh filled column is placed on the stream as a new column in the series at the opposite end from that end where the spent grounds in the column are being withdrawn from the system.

It is usual that the counter-current extraction train consist of from about 5 to about 16 columns. A typical extraction train more often than not will consist of six columns. In the drawing only one column 10 is shown for purposes of describing this invention. However, any particular column when in actual use is connected at its liquid outlet line, not shown in the drawing, to the next column in the series.

A major problem in the counter-current extraction process is the pressure drops across the extraction system which affect the cycle time, yield, and capacity. The cycle time is defined as the time interval between successive extract draw-offs. The yield is defined as the amount of soluble coffee obtained compared on a weight percent basis to the amount of roast and ground coffee used in a given column. The column capacity is defined as the amount of roast and ground coffee which can be put through a particular extraction column in one cycle. The elimination or minimization of pressure drops can improve the process operation by reducing cycle time, increasing yield, and increasing column capacity.

In regard to the column pressure drop phenomena it is well recognized that the most uniform flow distribution can be obtained with regular geometrically shaped particles of uniform size. However, when roast and ground coffee is placed in an extraction column, there is included a wide range of particle sizes. The inclusion of a range of irregular sizes of roast and ground coffee particles permits irregular distribution and unpredictable flow characteristics which generally depend on the extent to which small particles (i.e. fines) fall in the interstices between larger ones. For example, as the coffee extract flows through a bed of roast and ground coffee particles within a column, and moves towards the top of the column, the coffee fines become buoyed up by the extract liquid and move, along with the extract, towards the top of the column filling up the interstices between the larger particles. Filling up of the interstices between the larger particles clogs the column bed and prevents extract from passing therethrough which in turn builds up a large back pressure. Eventually, a complete shutdown and cleaning process can be necessary. This is extremely costly and time consuming.

In conventional extraction of roast and ground coffee to prepare an instant coffee product, any roast and ground coffee particle size more coarse than through 20 mesh screen is desirable for extraction. As a general rule, without using the uniform prewetting method of this invention no more than about 7% of the grounds employed can pass through a 20 mesh screen without creating the usual pressure and clogging problems that accompany the use of a high percentage of fines. However, using the prewetting system of this invention allows one to employ as much as 20% fines without encountering this problem. Consequently, one advantage of this invention is that the percentage of fines in the roast and ground coffee placed in an extraction column no longer need be as critically controlled by the operator.

While not wishing to be bound by any particular theory it is believed that using the method of this invention, i.e. uniform prewetting during loading of the extraction columns, allows for a greater use of coffee fines without the attendant disadvantages usually associated with large percentages of fines, primarily because of two factors: (1) the density of the fines is slightly increased which inhibits the tendency of the fines to be buoyed up by the extract moving through the column, and (2) the fines are uniformly prewetted while falling into the extraction column where they subsequently swell. The subsequent swelling of the particles causes larger interstices to be present within the fines which allows for easier extract flow. The prior art prewetting processes, it is believed, failed to overcome this problem because prewetting outside of the column resulted in placing the fines in the column after the swelling had occurred and the pressure of packing the coffee in the column eliminated any large interstices that existed and prewetting inside of the column, after loading, made uniform prewetting of the fines an impossibility. To eliminate the prior art disadvantages, it is critical to this invention that the prewetting of the coffee grounds be accomplished simultaneously with the loading process. Prewetting prior to loading, as shown in the Kappenberg et al. reference results in staling and other disadvantages enumerated previously. On the other hand, prewetting inside of the column results in inability to uniformly prewet and thereby fails to eliminate the pressure drop problem.

In order to more fully explain the process of this invention a detailed description with specific reference to the drawing is hereinafter given.

The prewetting of the roast and ground coffee is accomplished by uniformly dispersing the prewetting liquid on the ground coffee while loading the column. The prewetting liquid is preferably water but can be dilute coffee extract. It is highly preferred that the uniform prewetting of the roast and ground coffee be accomplished by spraying the prewetting liquid on the coffee which is being gravity fed into the extraction column 10. While spraying is the preferred means of uniformly dispersing the prewetting liquid on the ground coffee, other means of uniformly dispersing the prewetting liquid can be used, as for example uniform mixing in a vertical ribbon blender. For purposes of description the following discussion is directed to the specific use of a spraying apparatus 14.

FIG. 1 shows a plan view of an extraction column 10 with the loading hopper 12 (shown in FIG. 2) removed so as to more clearly show the relationship of the spraying apparatus 14 to the top opening 24 of the extraction column 10. Two oppositely disposed spray nozzles 18 and 20 are mounted near the periphery 28 and slightly above the top opening 24 of the extraction column 10. Enclosed in outer covering 30 (removed in FIG. 1 but shown in FIG. 2) is a conventional pressure valve not shown in the drawing, which is opened to let coffee in and closed during extraction. While only one spray nozzle can be utilized, a larger number of spray nozzles 18 and 20 can be mounted around the periphery of the top opening 24, of the extraction column 10 than the two depicted in FIG. 1. However, it has been found that using two oppositely disposed spray nozzles, 18 and 20, is preferred to accomplish the uniform prewetting of this invention. No criticality exists in regard to the number of spray nozzles, 18 and 20, employed.

FIGS. 2 and 3 show side views of two preferred embodiments of this invention being employed with an extraction column 10. Looking first at FIG. 2, roast and ground coffee is placed in the loading hopper 12. To let the coffee into the extraction column 10 the bottom of the hopper is opened (the bottom hopper opening is not shown in the drawing), the pressure valve (not shown in the drawing) inside outer covering 30 is opened and the coffee is gravity fed into extraction column 10. The uniform spraying apparatus 14, shown in FIG. 1, is mounted between the bottom of the hopper 12 and the top opening 24 of extraction column 10. As the coffee falls from the bottom of the hopper, it passes past spraying apparatus 14 and its nozzles, i.e. through a prewetting zone, where the desired amount of moisture is uniformly sprayed onto the coffee by the oppositely disposed spray nozzles 18 and 20 (depicted in FIG. 1). In actual practice, the spraying apparatus 14 is preferably enclosed in an outer covering 16 as shown in FIG. 2. The coffee after falling through the prewetting zone falls through the top aperture 24 of the extraction column 10 and continues on down into the column. Also depicted in FIG. 2 is the blow down valve 36 which is used during removal of spent grounds after extraction is completed.

Looking now at FIG. 3 which represents an equally satisfactory apparatus for employing the uniform prewetting method of this invention. The principal difference between the apparatus shown in FIG. 2 and FIG. 3 is that in FIG. 3 the uniform prewetting spraying devices, 18 and 20, are mounted in an intracolumnar fashion near the top opening 24 of the extraction column 10. As roast and ground coffee contained in the hopper 12 is gravity fed into the column the intracolumnar spraying nozzles, depicted herein as two oppositely disposed nozzles, 18 and 20, spray the desired amount of moisture on the falling stream of coffee. Thereafter, valves on the spray nozzles 18 and 20, not shown in FIG. 3, are closed and extraction continues in the manner described above.

The use of two oppositely disposed spray nozzles, 18 and 20, in intra-columnar fashion, is depicted herein for purposes of description only. A plurality of such spraying devices 14 can also be mounted in intra-columnar fashion around the top opening, 24, of the extraction column 10 or a single nozzle can be so mounted.

The angle of the spray nozzles, 18 and 20, in relationship to the falling stream of coffee particles is not critical. However, it is most convenient and preferred that the spray nozzles, 18 and 20, be situated in perpendicular relationship to the falling coffee particles. The distance from the spray nozzles, 18 and 20, to the falling coffee particles is likewise not critical. Generally speaking, the distance employed should be large enough that the prewetting liquid be sufficiently atomized prior to contacting the coffee. A preferred distance is from about 4 to about 12 inches. The spray nozzle aperture, 38 is not critical and can be of any diameter less than about 3/16 of an inch. With apertures much larger than about 3/16 of an inch, the prewetting liquid is not sufficiently atomized to effect uniform dispersion. Usually nozzle apertures smaller than about 1/64 of an inch are not feasible to utilize in the process of this invention.

The amount of moisture used in the uniform prewetting method of this invention must be carefully controlled. The final moisture content of the prewet roast and ground coffee should be from about 10% by weight of the roast and ground coffee to about 30% by weight of the roast and ground coffee. If the final moisture content is less than about 10% on a weight basis, the advantages of uniform prewetting are not demonstrated to any significant degree. On the other hand, if the total moisture content exceeds 30%, the coffee is no longer a prewetted or moistened coffee but rather is more aptly characterized as a slurry of coffee muds. A highly preferred final moisture content of prewetted coffee is from about 16% to about 25%. It has been found that total moisture contents within this preferred range optimize the advantages of this invention, i.e., higher yields are obtained and fewer pressure dropping problems occur.

When speaking of total or final moisture content on a weight basis, what is meant is the ratio of the total weight of the moisture to the weight of the roast and ground coffee. Roast and ground coffee in its natural state has a moisture content of from about 3% to about 6% on a weight basis. Thus, when speaking of a final moisture content of, for example, 12%, only about 9% of weight moisture need be added if the roast and ground coffee has a natural moisture content of 3%. In all portions of this specification, when the percentage moisture content is referred to, the term is used to indicate the total moisture content, i.e., 3% to 6% natural moisture plus added moisture.

The gravity fed coffee is preferably allowed to fall into the column 10 at a rate of from about 250 lbs./minute to about 550 lbs./minute. The prewet aqueous liquid is preferably sprayed onto the falling coffee at a rate of from about 30 lbs./minute to about 100 lbs./minute. No criticality exists in adjusting the rate of fall of the coffee and the prewetting spray rate. The two rates must be chosen so that all prewetting occurs simultaneously with loading. Adjustment to any particular rate is a matter of choice within the skill of the operator.

After the prewet coffee settles in the column, the natural swelling phenomena of prewet coffee occurs. Because all of the coffee is prewet in a uniform manner, all of the coffee exhibits the swelling phenomenon. After loading the column can be connected into a conventional countercurrent extraction train as the freshest column. The column is connected into the system through the liquid inlet line, not shown, on one side and the liquid outlet line, not shown, on the other side.

It is preferred that the grind size of the roast and ground coffee employed in the process of this invention be as follows: From about 60 to about 70% on a 10 mesh U.S. Standard Screen, from about 25 to about 35% on a 20 mesh U.S. Standard Screen and from about 2 to 7% through a 20 mesh U.S. Standard Screen. The preferred grind size ranges just described are much coarser than the coffee used in the previously cited Kappenberg et al. reference. In fact, the Kappenberg reference teaches away from the use of coffee as coarse as applicants prefer to use. Kappenberg et al. at page 3, column 2, lines 9 through 20 teaches that coffee with a screen analysis of about 2% retained on a 12 mesh screen, about 7% on a 20 mesh screen and about 15% on a 40 mesh screen with the remainder through a 40 mesh screen in about as coarse as can be used in his method of prewetting outside of the extraction column.

It is preferred that the column packing density be from about 17 lbs. per cubic foot to about 28 lbs. per cubic foot with from 19 to 25 pounds being most highly preferred. When column packing densities within this range are employed optimization of the advantages of the uniform prewetting method of this invention is realized. Thus, by controlled packing of the coffee in the columns more consistent results are obtained and the column throughput can be greatly increased. The term packing density refers to the number of pounds of roast and ground coffee per cubic foot of volume inside of the extraction column.

The achievement of the objects of this invention is due not only to the uniform prewetting during loading aspect of this invention, but also due to the novel combination of grind size, the amount of prewetting liquid employed and packing density. The employment of each of these factors within the preferred ranges acts in a cooperative manner to give higher yields, less pressure problems, improved flavor, higher extraction capacities, shorter cycle time, and a less expensive extraction process.

An especially preferred process utilizing the uniform prewetting method of this invention is as follows: (a) prewetting roast and ground coffee by spraying aqueous liquid on said coffee as it is being loaded into an extraction column to provide uniformly prewet loaded coffee; said coffee having a grind size range from about 60 to about 70% on a 10 mesh, from about 25 to about 35% on a 20 mesh and from about 2 to about 7% through a 20 mesh; said aqueous liquid being provided to adjust the final moisture of the coffee to a level ranging from about 16% to about 25% by weight; (b) providing a bed of said prewet loaded coffee, in extraction column 10, having a substantially uniform density ranging from about 19 to about 25 lbs. per cubic foot; and (c) extracting said bed with an extract obtained by passing aqueous liquid through partially extracted roast and ground coffee.

The following examples are offered as a means of illustrating one specific embodiment of the method of this invention and, therefore, should not be taken as a limitation upon the scope of this invention. In evaluating the uniform prewetting method of this invention several pilot plant runs were conducted and compared with an identical run without prewetting.

EXAMPLES

A six column pilot plant extraction train was set up. Each of the six columns were substantially similar to the column 10 shown in FIG. 2 and was fitted with a spraying apparatus 14, as shown in FIG. 2, and more clearly shown in the plan view of FIG. 1. The distance from the oppositely disposed spray nozzles, 18 and 20, to the center of the extraction column aperture 24 was 9½ inches. The oppositely disposed spray nozzles, 18 and 20, were mounted 8½ inches above the top of the extraction column aperture 24 and 5 inches from the hopper bottom opening. The spray nozzle aperture 38 depicted in FIG. 1 was 1/16 inch. Each column of the extraction train was 4 ft. long and had a 6 inch inside diameter. The columns were connected to one another by a liquid inlet line and a liquid outlet line.

In each of the four runs shown in the table, the final moisture content was 20% with the exception of run A which did not involve prewetting. In each of the runs the grind size was as follows: 65% on 10 mesh, 30% on 20 mesh and 5% through 20 mesh. The extraction column packing density ranged from 19.2 pounds per cubic foot to 20.4 pounds per cubic foot. The specific packing densities for each run are given in the table. Examples 1, 2 and 3 exhibited no pressure drop problems while run A did exhibit pressure drop problems.

The six column extraction train was run using conventional extraction conditions. Beginning with the column containing the most nearly exhausted coffee grounds and thereafter progressing sequentially to the column containing the freshest coffee grounds, the inlet temperature to each column was as follows 360° F., 350° F., 325° F., 310° F., 280° F., 230° F. The pressure employed during the extraction runs was 150 p.s.i.g.

In each run the designated amount of roast and ground coffee was placed in a loading hopper 12 and thereafter gravity fed into the extraction column 10. In runs 2, 3 and 4 the falling coffee particles (rate of fall 500lbs./minute) were subjected to uniform spraying of prewetting water from the oppositely disposed spray nozzles, 18 and 20. In run number 1 no prewetting occurred. The natural occurring moisture content of the roast and ground coffee employed was 5.5%. The spraying flow rate in Examples 1, 2 and 3 was 66.4 lbs. of water/minute. In the runs depicted in Examples 1, 2 and 3, no staling of the coffee occurred.

TABLE.—COMPARISON OF EXTRACTION RUNS WITH AND WITHOUT PREWETTING

| Run | A | Example 1 | Example 2 | Example 3 |
|---|---|---|---|---|
| Condition of ground coffee | (1) | (2) | (2) | (2) |
| Final moisture content (percent) | | 20.0 | 20.0 | 20.0 |
| Column load on a dry basis, lbs | 20.4 | 19.6 | 19.7 | 19.2 |
| Packing density, lbs. per cu. ft | 20.4 | 19.6 | 19.7 | 19.2 |
| Average cycle time, min | 19.3 | 16.5 | 15.2 | 12.8 |
| Yield on a percent basis | 45.2 | 47.3 | 47.1 | 47.6 |
| Increased extraction train capacity (percent) | 0 | 17.6 | 27.3 | 49.0 |

1 No prewetting.
2 Uniform prewetting.

As can be seen from examination of the above table in those runs in which the uniform prewetting during loading method of this invention was employed had greater yields, shorter cycle times, increased extraction train capacity and as previously explained, exhibited no pressure drop problem.

The process of Example 1 is repeated with the following changes: The Kappenberg method of prewetting outside of the extraction column is employed; the prewetting liquid is mixed with the roast and ground coffee in a ribbon blender, is allowed to swell and is then packed in the extraction column. The yield on a percent basis is 38.1% and the extraction train capacity is decreased 11.2%. Clogging and pressure drop problems were encountered frequently. The coffee produced has a noticeable off taste indicating staling has occurred.

The process of Example 1 is again repeated with the following changes: The Sivetz method of prewetting inside of the extraction column, after loading, is employed. The yield on a percent basis is 36.1% and the extraction column capacity is decreased 8.0%. Clogging and severe pressure drop problems were encountered which made the process not feasible for commercial practice when employing the preferred grind sizes of coffee utilized in Example 1.

Examples 1, 2 and 3 were carried out using the intracolumnar prewetting apparatus of FIG. 3 and the results were identical.

What is claimed is:

1. An improvement in an extraction process whereby the process has increased capacity and a minimum amount of coffee handling, said improvement comprising:

prewetting roast and ground coffee by uniformly dispersing on said coffee, as it is being loaded into an extraction column, aqueous liquid to provide a uniformly prewet loaded coffee having a final moisture content of from about 10% to about 30% by weight.

2. The method of claim 1 wherein said aqueous liquid is uniformly dispersed by spraying.

3. The method of claim 2 wherein the final moisture content of said coffee is from about 16% to about 25%.

4. The method of claim 1 wherein said coffee has a grind size ranging from about 60% to about 70% on 10 mesh, from about 25% to about 35% on 20 mesh and from about 2% to about 7% through a 20 mesh.

5. The method of claim 1 wherein said prewet loaded coffee has a substantially uniform density ranging from about 17 to about 28 lbs. per cubic foot.

6. The method of claim 5 wherein the uniform density is from about 19 to 25 lbs. per cubic foot.

7. An extraction process characterized by increased capacity and a minimum amount of coffee handling, said process comprising the steps of:

(A) Prewetting roast and ground coffee by spraying aqueous liquid on said coffee as it is being loaded into an extraction column to provide uniformly prewet loaded coffee; said coffee having a grind size range from about 60 to about 70% on a 10 mesh, from about 25 to about 35% on a 20 mesh and from about 2 to about 7% through a 20 mesh; said aqueous liquid being provided to adjust the final moisture of the coffee to a level ranging from about 16% to about 25% by weight;

(B) Providing a bed of said prewet loaded coffee having a substantially uniform density ranging from about 19 to about 25 lbs. per cubic foot;

(C) Extracting said bed with an extract obtained by passing aqueous liquid through partially extracted roasted and ground coffee.

References Cited

UNITED STATES PATENTS

| | | | |
|---|---|---|---|
| 1,123,827 | 1/1915 | Whitaker et al. | 99—70X |
| 2,155,971 | 4/1939 | Houseman | 99—71 |
| 2,340,758 | 2/1944 | Kappenberg et al. | 99—71 |
| 2,562,206 | 7/1951 | Nutting | 99—71 |
| 2,931,727 | 4/1960 | Kraut | 99—71 |
| 3,092,498 | 6/1963 | White et al. | 99—71 |
| 3,132,947 | 5/1964 | Mahlmann | 99—71 |
| 3,143,428 | 8/1964 | Reimers et al. | 99—141 |
| 3,244,531 | 4/1966 | Clinton et al. | 99—71 |

OTHER REFERENCES

Sivetz et al., Coffee Processing Technology, The Avi Publishing Company, Inc., Westport, Conn., copyright 1963, vol. I, pp. 338–368, vol. 2, pp. 128–144.

DENNIS E. TALBERT, JR., Primary Examiner

U.S. Cl. X.R.

99—289, 300